United States Patent
Aoki (10) Patent No.: US 9,121,534 B2
(45) Date of Patent: Sep. 1, 2015

(54) PIPE COUPLING AND COUPLING MEMBER THEREOF

(71) Applicant: NITTO KOHKI CO., LTD., Tokyo (JP)

(72) Inventor: Kazunori Aoki, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 0 days.

(21) Appl. No.: 14/140,065

(22) Filed: Dec. 24, 2013

(65) Prior Publication Data
US 2014/0183859 A1 Jul. 3, 2014

(30) Foreign Application Priority Data
Dec. 28, 2012 (JP) ................. 2012-287398

(51) Int. Cl.
*F16L 25/00* (2006.01)
*F16L 21/08* (2006.01)
*F16L 37/12* (2006.01)

(52) U.S. Cl.
CPC ............. *F16L 21/08* (2013.01); *F16L 37/1205* (2013.01); *F16L 2201/40* (2013.01)

(58) Field of Classification Search
USPC .................................. 285/316, 317, 260, 328
See application file for complete search history.

(56) References Cited

U.S. PATENT DOCUMENTS

| 2,985,469 | A | * | 5/1961 | Bowman, Jr. | 285/260 |
| 3,128,476 | A | * | 4/1964 | Lash | 285/305 |
| 4,579,193 | A | * | 4/1986 | von Recklinghausen | 181/175 |
| 5,380,049 | A | * | 1/1995 | Smowton | 285/148.2 |
| 6,890,004 | B2 | * | 5/2005 | Naito | 285/93 |
| 7,673,911 | B2 | * | 3/2010 | Liu | 285/316 |
| 2003/0025326 | A1 | * | 2/2003 | Schulte | 285/316 |

FOREIGN PATENT DOCUMENTS

| AU | 627018 | 8/1992 |
| DE | 195 29 545 A1 | 10/1996 |
| EP | 2 278 205 A1 | 1/2011 |
| JP | 2006-266336 | 10/2006 |

OTHER PUBLICATIONS

Extended European Search Report issued May 20, 2014 in corresponding European Application No. 13020136.1.

* cited by examiner

*Primary Examiner* — Aaron Dunwoody
(74) *Attorney, Agent, or Firm* — Wenderoth, Lind & Ponack, L.L.P.

(57) ABSTRACT

A coupling member is provided that is readily separable from another coupling member even if frozen. A female coupling member has a coupling member fitting portion capable of receiving a male coupling member, a recess formed on an inner circumferential surface of the coupling member fitting portion and having an opening portion opening on the inner circumferential surface and a bottom portion, and a plurality of pliable members secured to the bottom portion and extending from the bottom portion to the opening portion so as to be capable of contacting an outer circumferential surface of the male coupling member.

13 Claims, 6 Drawing Sheets

PIPE COUPLING AND COUPLING MEMBER THEREOF

BACKGROUND OF THE INVENTION

1. Field of the Invention

The present invention relates to a pipe coupling comprising a male coupling member and a female coupling member, which are coupled by being fitted to each other. More particularly, the present invention relates to a pipe coupling used in a situation in which the male and female coupling members as coupled together are likely to become difficult to decouple (separate) from each other due to freezing.

2. Description of Related Art

At a hydrogen supply station where hydrogen is supplied to a hydrogen automobile, for example, the supply of hydrogen is carried out by using a female coupling member (socket) and a male coupling member (plug), which are coupled to each other. The female coupling member is provided at the distal end of a supply hose extending from a station tank storing gaseous or liquid hydrogen at high pressure and at low temperature. The male coupling member is provided at the outer end of a hydrogen receiving pipe of a hydrogen storage tank mounted in the hydrogen automobile. Therefore, there is a possibility that the coupled female and male coupling members may be frozen during the supply of hydrogen, causing the moisture in the surrounding air to condense and freeze on the mutually contacting surfaces of the female and male coupling members, making it difficult to decouple the female and male coupling members from each other. Even if the fluid to be handled is not at such a low temperature, a similar problem can occur to the female and male coupling members coupled by being fitted to each other in an extremely cold region. A similar problem can also occur between a female coupling member and a locking element-actuating sleeve slidably fitted over the outer circumferential surface of the female coupling member so as to be movable between a position for engaging locking elements with a male coupling member to securely connect the male coupling member to the female coupling member and a position for allowing the locking element to be disengaged from the male coupling member.

There have been developed various techniques to solve the above-described problem due to freezing. For example, Japanese Patent Application Publication No. 2006-266336 discloses an electromagnetic valve in which, when an electromagnetic coil is not energized, a movable core is placed close to a stator core with a gap provided therebetween to prevent freezing between the movable and stator cores, thereby allowing the movable core to move smoothly when the electromagnetic coil is energized.

SUMMARY OF THE INVENTION

The present invention has been made in view of the above-described circumstances.

Accordingly, an object of the present invention is to provide a pipe coupling of the type described above, which is structured so that, even if frozen together, the fittingly coupled male and female coupling members can be easily decoupled from each other.

Another object of the present invention is to provide a coupling member for use in the pipe coupling of the present invention.

According to the present invention, there is provides one coupling member of male and female coupling members of a pipe coupling that are decouplably coupled by being fitted to each other. The one coupling member includes a coupling member fitting portion having a circumferentially extending circumferential surface having a width in a longitudinal axis direction of the one coupling member. The circumferential surface contacts, when the one coupling member is fitted to the other coupling member, a circumferentially extending corresponding circumferential surface of a fitted portion of the other coupling member. The corresponding circumferential surface has a width in a longitudinal axis direction of the other coupling member. The one coupling member further includes at least one circumferentially extending annular recess for anti-freezing formed on the circumferential surface of the coupling member fitting portion. The recess has a width in the longitudinal axis direction of the one coupling member and has an opening portion opening on the circumferential surface and a bottom portion.

As has been stated above, the conventional pipe coupling suffers from the following problem. When the fittingly coupled female and male coupling members are placed under extremely low-temperature conditions, the moisture in the surrounding air or the like may condense and freeze on the mutually contacting surfaces of the coupling members, making it difficult to decouple the coupling members from each other. In this regard, provision of the above-described recess allows a reduction of the force required to decouple the coupling members as compared to the conventional structure having no such a recess.

The one coupling member may further have a plurality of pliable members secured to the bottom portion of the recess to extend from the bottom portion to the opening portion so as to be capable of contacting the corresponding circumferential surface of the other coupling member as fitted to the one coupling member. It was confirmed that provision of such pliable members allows the coupling members to be separated from each other with a reduced force. The reason for this may be considered as follows. Freezing at the area of contact between the coupled coupling members occurs along the peripheral edges of the recess and also occurs at the area of contact between the circumferential surface of the other coupling member and the plurality of pliable members capable of contacting the circumferential surface. Thus, freezing locally occurs at scattered points in the area of contact between the two coupling members. Further, owing to the properties thereof, the pliable members offer a favorably low resistance to the force for separating the two coupling members.

The pliable members may be made of a synthetic resin. Specifically, the one coupling member may include a strip of tape having a surface secured to the bottom portion of the recess and an opposite surface opposite to the secured surface, and the pliable members may be formed to extend from the opposite surface of the strip of tape. More specifically, the pliable members may be formed by using a hook-and-loop fastener comprising a strip of tape having a multiplicity of hooks and a strip of tape having a multiplicity of loops. That is, either of the strips of tape is bonded to the bottom portion of the recess, and the multiplicity of hooks or loops extending from the bonded strip of tape are used as the pliable members.

The term "pliable members" as used herein means members that can maintain pliability in the service environment of the pipe coupling. It should be noted that, when the above-described hook-and-loop fastener is used, the hooks themselves are not so pliable, but when a transverse force is applied thereto, the hooks are readily bent particularly at a portion of each hook at the joint with the strip of tape. In this specification, the term "pliable members" includes such hooks or the like.

The annular recess may comprise a plurality of recesses spaced from each other in the longitudinal axis direction of the coupling member fitting portion. It was confirmed that the plurality of recesses allows a reduction of the force required to decouple the coupling members. The reason for this may be considered due to the fact that freezing locally occurs at scattered points and, consequently, ice formed at each frozen portion is reduced in size as in the case of the above-described structure having a plurality of pliable members provided in one recess.

In addition, the present invention provides a female coupling member of a pipe coupling comprising male and female coupling members decouplably coupled by being fitted to each other. The female coupling member includes a tubular coupling member fitting portion receiving the male coupling member, and a locking element provided to the coupling member fitting portion. The locking element is displaceable between a locking position where the locking element engages the male coupling member as received in the coupling member fitting portion to securely couple the male coupling member to the female coupling member and an unlocking position where the locking element is displaced radially outward from the locking position to disengage from the male coupling member, thereby enabling the male coupling member to be decoupled from the female coupling member. The female coupling member further includes a locking element-actuating sleeve slidably fitted over an outer circumferential surface of the female coupling member. The locking element-actuating sleeve is displaceable between a pressing position for pressing the locking element to the locking position from the radially outer side and a pressure canceling position for allowing the locking element to be displaced to the unlocking position. Further, the female coupling member includes at least one circumferentially extending annular recess for anti-freezing formed on the outer circumferential surface of the female coupling member, over which the locking element-actuating sleeve slides. The annular recess has an opening portion opening on the outer circumferential surface and a bottom portion.

In the above-described structure, the annular recess may be provided on the inner circumferential surface of the locking element-actuating sleeve instead of being provided on the outer circumferential surface of the female coupling member.

In the above-described structures, a plurality of pliable members may be provided on the bottom portion of the annular recess to extend to the opening portion so that the distal ends of the pliable members can contact the inner circumferential surface of the sleeve or the outer circumferential surface of the female coupling member. It was confirmed that provision of a plurality of such pliable members enables the frozen sleeve and female coupling member to be moved relative to each other with a reduced force.

In addition, the present invention provides a pipe coupling having the above-described coupling member.

The present invention will be explained below by way of embodiments illustrated in the accompanying drawings.

DETAILED DESCRIPTION OF THE INVENTION

Figure 1:
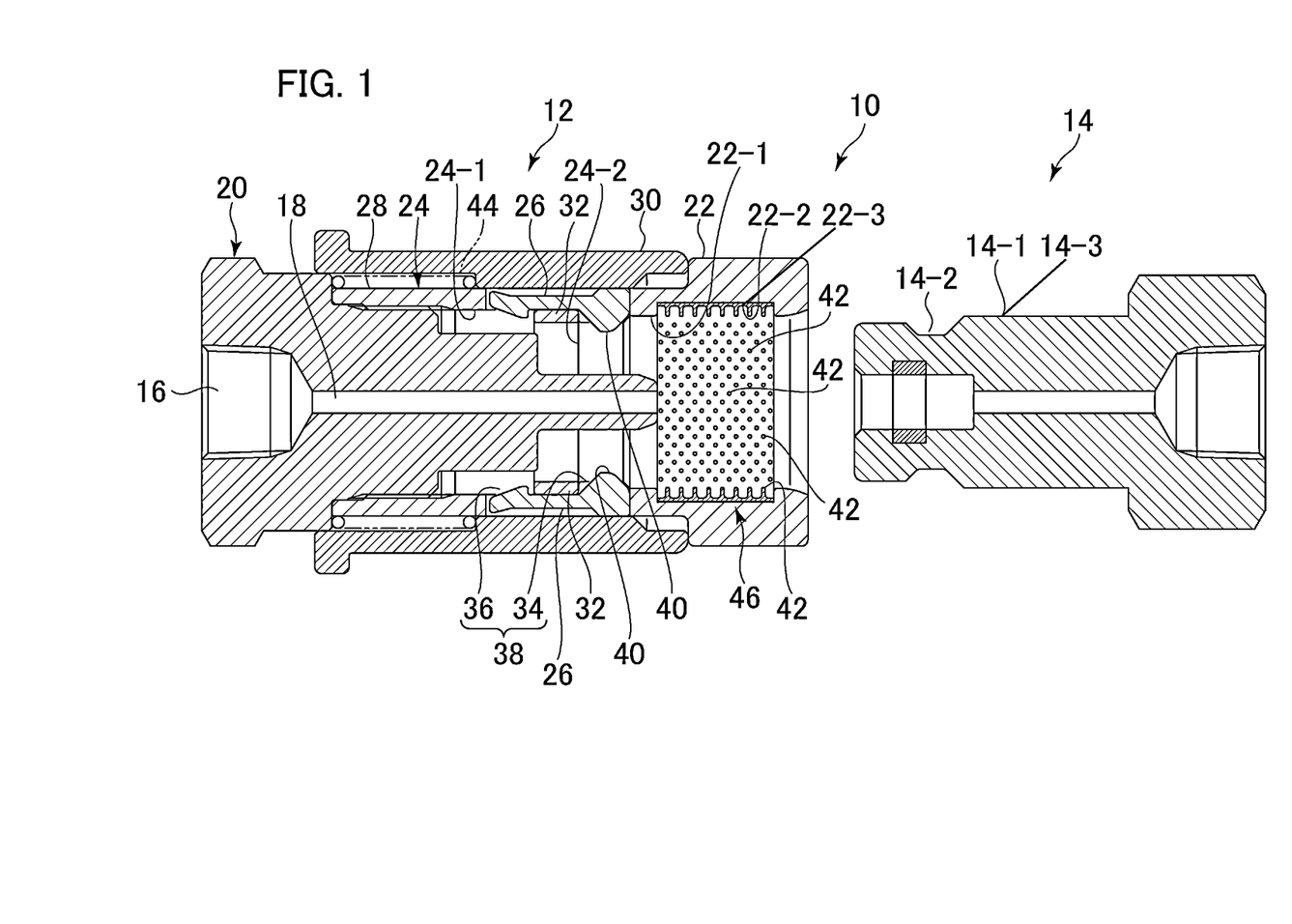
FIG. 1 is a longitudinal sectional view of a pipe coupling according to the present invention, showing a state where a female coupling member and a male coupling member are separate from each other.
Figure 3:
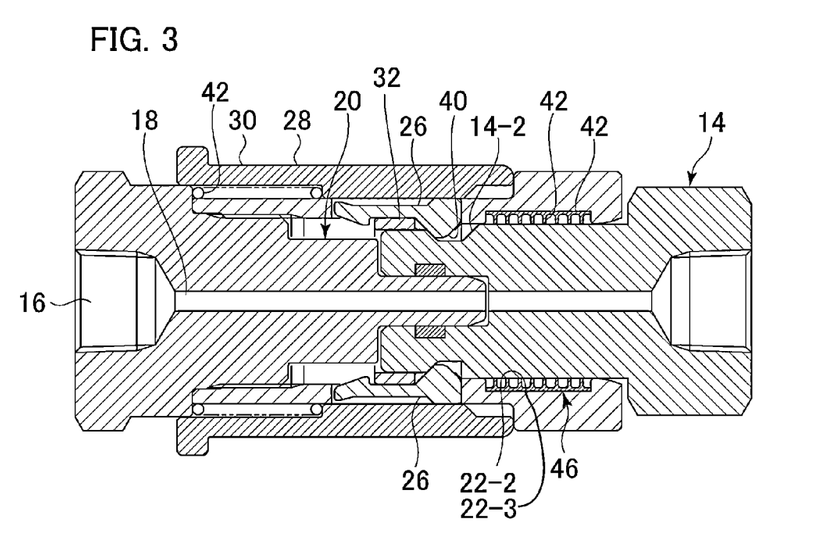
FIG. 3 is a longitudinal sectional view of the pipe coupling in FIG. 1, showing a state where the female coupling member and the male coupling member have been coupled by being fitted to each other.

FIG. 1 shows a pipe coupling 10 according to the present invention. The pipe coupling 10 has a female coupling member 12 and a male coupling member 14, which can be suitably used to supply hydrogen to a hydrogen automobile wherein the female coupling member 12 is provided at the distal end of a supply hose extending from a station tank storing gaseous hydrogen at a low temperature of $-40°$ C. under a high pressure of 83 megapascals at a hydrogen supply station and the male coupling member 14 is provided at the outer end of a hydrogen receiving pipe of a hydrogen storage tank mounted in a hydrogen automobile. As shown in FIG. 3, the female coupling member 12 is fittingly coupled to the male coupling member 14 to supply the low-temperature gaseous hydrogen.

The female coupling member 12 includes a proximal end member 20 having an inlet opening 16 to be connected with the distal end of the supply hose extending from the tank storing gaseous hydrogen at the hydrogen supply station and further having a small-diameter supply passage 18 extending forward from the inlet opening 16. The female coupling member 12 further includes a tubular body 24 thread-coupled to the proximal end member 20 and having at the forward end thereof a coupling member fitting portion 22 receiving and fitting the male coupling member 14.

Figure 4:
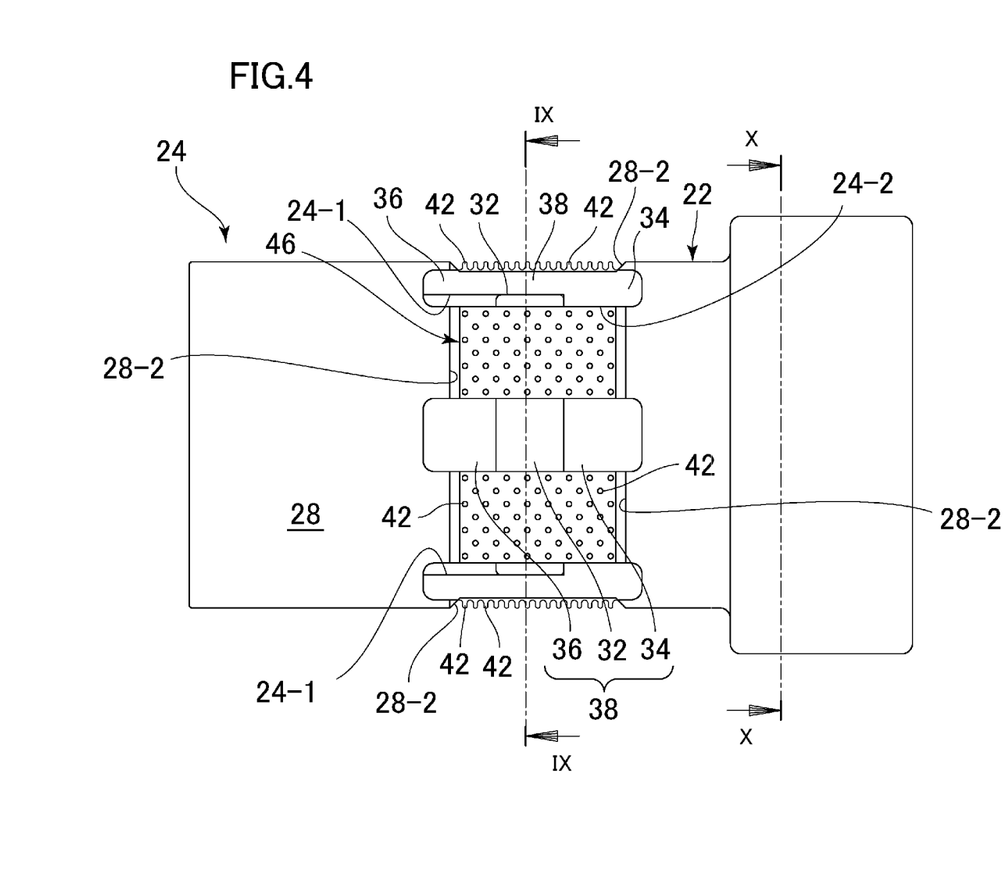
FIG. 4 is a plan view of a tubular body of the female coupling member shown in FIG. 1.

The tubular body 24 is provided with a plurality (six in the illustrated embodiment as can be best seen from FIG. 9) of circumferentially equally spaced locking elements 26 provided at the rear of the coupling member fitting portion 22 (substantially at the center in the longitudinal axis direction of the tubular body 24) and a locking element-actuating sleeve 30 provided around an outer circumferential surface 28 of the tubular body 24 slidably in the axial direction of the tubular body 24 to actuate the locking elements 26. The locking elements 26 are each set in an elongated accommodating portion 38 which, as best shown in FIG. 4, has a forward opening 34 and a rear opening 36 provided at forward and rear positions, respectively, facing each other across a support portion 32 for supporting the associated locking element 26.

Figure 2:
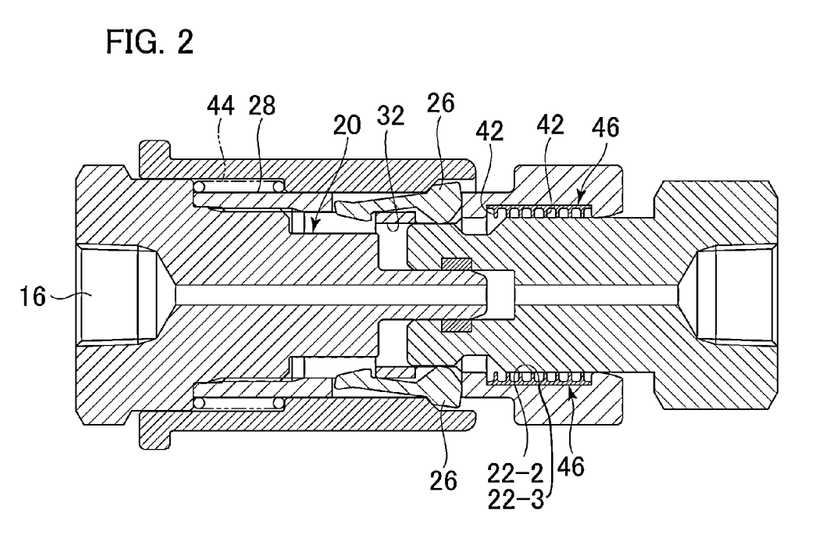
FIG. 2 is a longitudinal sectional view of the pipe coupling in FIG. 1, showing a state where the female coupling member has begun to be fitted onto the male coupling member, with a locking element-actuating sleeve placed in a pressure canceling position closer to the rear end of the female coupling member.
Figure 9:
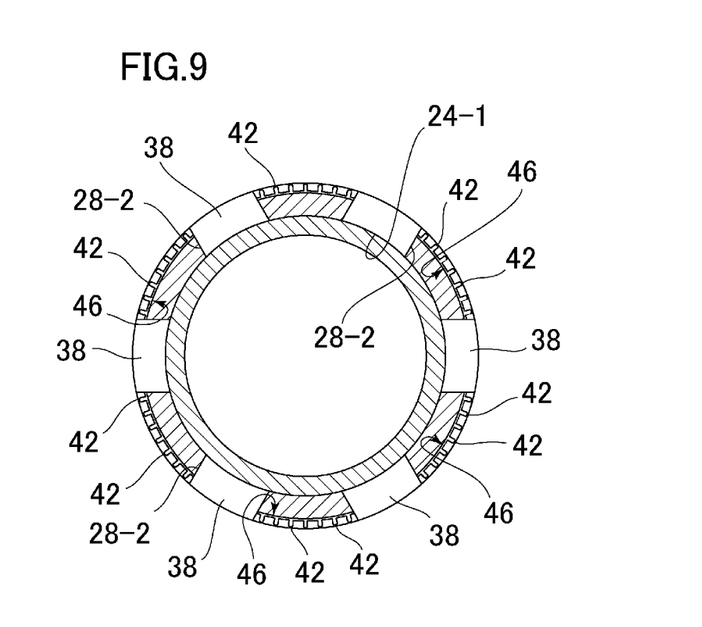
FIG. 9 is a sectional view taken along the line IX-IX in FIG. 4.
Figure 10:
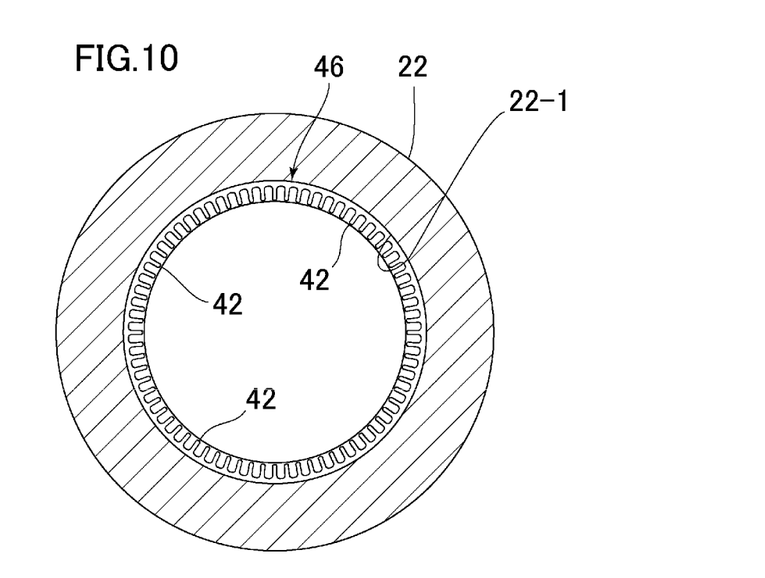
FIG. 10 is a sectional view taken along the line X-X in FIG. 4.

The forward and rear openings 34, 36 extend through the tubular body 24 in the radial direction thereof. It should be noted that, in the illustrated specific embodiment, as shown in FIG. 9, elongated accommodating portions 38 are provided to extend through the tubular body 24, and a ring-shaped support portion 32 is secured to an inner circumferential surface 24-1 of the tubular body 24, thereby forming forward openings 34 and rear openings 36 (see FIG. 4) forward and rearward, respectively, of the ring-shaped support portion 32. More specifically, the tubular body 24 has retaining portions 24-2 which are formed on the inner circumferential surface 24-1 and circumferentially aligned with the forward openings 34. The retaining portions 24-2 extends more radially inward than the rest of the inner circumferential surface 24-1 of the tubular body 24 so that the ring-shaped support portion 32 is inserted into the tubular body 24 from the left-hand side as seen in FIG. 1 and engaged by the retaining annular portions 24-2 to be retained there. When the locking element-actuating sleeve 30 is in a pressing position shown in FIGS. 1 and 3, the locking elements 26 are placed in a locking position where latch portions 40 provided at the forward ends of the locking elements 26 are pressed from the radially outer side by the locking element-actuating sleeve 30 to pass through the respective forward openings 34 and to project inward of the tubular body 24. In the locking position, the latch portions 40 are engaged in an annular latch receiving recess 14-2 formed on an outer circumferential surface 14-3 of a fitting portion 14-1 of the male coupling member 14 as inserted and fitted into the coupling member fitting portion 22 of the female coupling member 12, thereby locking the male coupling member 14 to the female coupling member 12. When the locking element-actuating sleeve 30 is, as shown in FIG. 2, placed in a pressure canceling position rearward of the pressing position against a coil spring 44, the locking elements 26 are displaced to an unlocking position where the latch portions 40 are placed radially outward off the annular latch receiving recess 14-2 by the male coupling member 14 when inserted into or pulled out of the female coupling member 12. The described structure and operation of the combination of the locking element-actuating sleeve 30 and the locking elements 26 are widely known to those skilled in the art; therefore, a further detailed explanation thereof is omitted.

Further, the pipe coupling 10 according to the present invention has the following structure.

The coupling member fitting portion 22 of the female coupling member 12 has an annular recess 22-2 provided on an inner circumferential surface 22-1 thereof. The recess 22-2 extends in the circumferential direction of the coupling member fitting portion 22. A plurality of elongated pliable members 42 are provided on a bottom portion 22-3 of the recess 22-2. The pliable members 42 extend to an opening portion 22-4 of the recess 22-2 that opens on the inner circumferential surface 22-1 of the coupling member fitting portion 22, so that the pliable members 42 can contact the outer circumferential surface 14-3 of the male coupling member 14 as fitted into the coupling member fitting portion 22.

In the illustrated embodiment, the pliable members 42 are formed by using a hook-and-loop fastener known as "Velcro (registered trademark)" comprising a pair of tape strips having hooks and loops, respectively, which are engageable with each other. Specifically, a tape strip 46 having hooks of a hook-and-loop fastener is secured at a peripheral surface 46-1 thereof (see FIG. 5) to the bottom portion 22-3 of the recess 22-2, and hooks extending from an inner surface 46-2 of the tape strip 46 are used as the above-described elongated pliable members 42.

Figure 5:
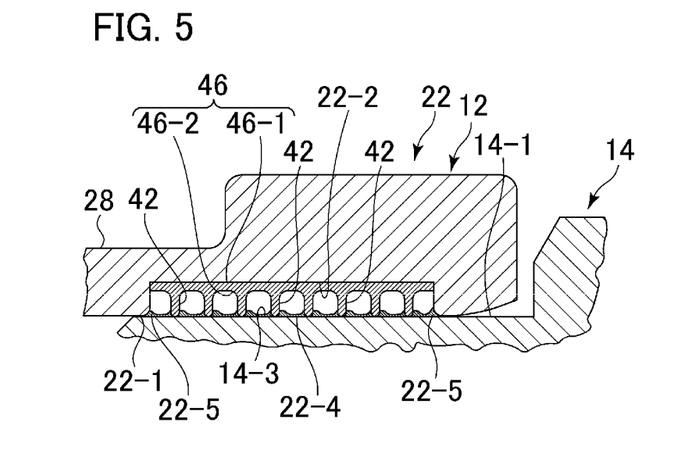
FIG. 5 is a fragmentary enlarged sectional view schematically showing the way in which freezing occurred between the inner circumferential surface of a coupling member fitting portion of the female coupling member and the outer circumferential surface of the male coupling member when the pipe coupling in the state shown in FIG. 3 was frozen at a temperature of $-40°$ C.
Figure 6:
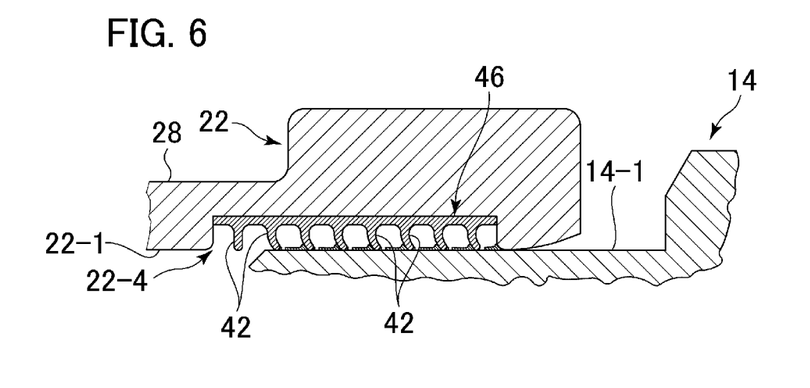
FIG. 6 is a fragmentary enlarged sectional view similar to FIG. 5, showing the pipe coupling in a state where the female coupling member and the male coupling member have begun to be separated from each other.

We carried out a freezing test on the pipe coupling 10 comprising the male coupling member 14 and the female coupling member 12 having the recess 22-2 and the pliable members 42. That is, the male coupling member 14 was fitted into the female coupling member 12, and the coupled coupling members 14 and 12 were placed in a low-temperature condition of −40° C. FIG. 5 schematically shows the way in which freezing occurred between the mutually contacting circumferential surfaces (inner circumferential surface 22-1 and outer circumferential surface 14-3) of the female coupling member 12 and the male coupling member 14 in the freezing test. In the test, water was sprayed on at least one of the female and male coupling members 12 and 14 to facilitate freezing. The result of the test revealed that, as shown in the figure, the moisture froze particularly along the peripheral edges 22-5 of the opening portion 22-4 of the recess 22-2 provided in the coupling member fitting portion 22, and that the moisture also froze particularly at the area of contact between each pliable member 42 and the outer circumferential surface 14-3 of the male coupling member 14. We applied separating force to the frozen female and male coupling members 12 and 14 at room temperature. As a result, it was revealed that the female coupling member 12 having the pliable members 42 in the recess 22-2 and the male coupling member 14 were able to be separated from each other with a force substantially less than a half the force required for the conventional female coupling member having no recess 22-2. FIG. 6, which is a drawing similar to FIG. 5, shows the frozen female and male coupling members 12 and 14 when they have just begun to be separated from each other.

In the pipe coupling according to this embodiment, further, as shown in FIGS. 4-6 and 9, circumferentially extending recesses 28-2 are formed on the outer circumferential surface 28 of the female coupling member 12, over which the locking element-actuating sleeve 30 slides, such that each recess 28-2 is located between a pair of mutually adjacent accommodating portions 38. A tape strip 46 having hooks as stated above is secured to the bottom portion of each recess 28-2 to provide a plurality of pliable members 42. A freezing test similar to the above was carried out on the thus constructed pipe coupling. The result of the freezing test revealed that the locking element-actuating sleeve 30 can be slid over the female coupling member 12 with a reduced force. It should be noted that the circumferentially extending recesses 28-2 constitute an annular recess circumferentially extending on the outer circumferential surface 28 of the female coupling member 12 with the accommodating portions 38 provided along the annular recess to divide the annular recess into a plurality of recess segments.

Figure 7:
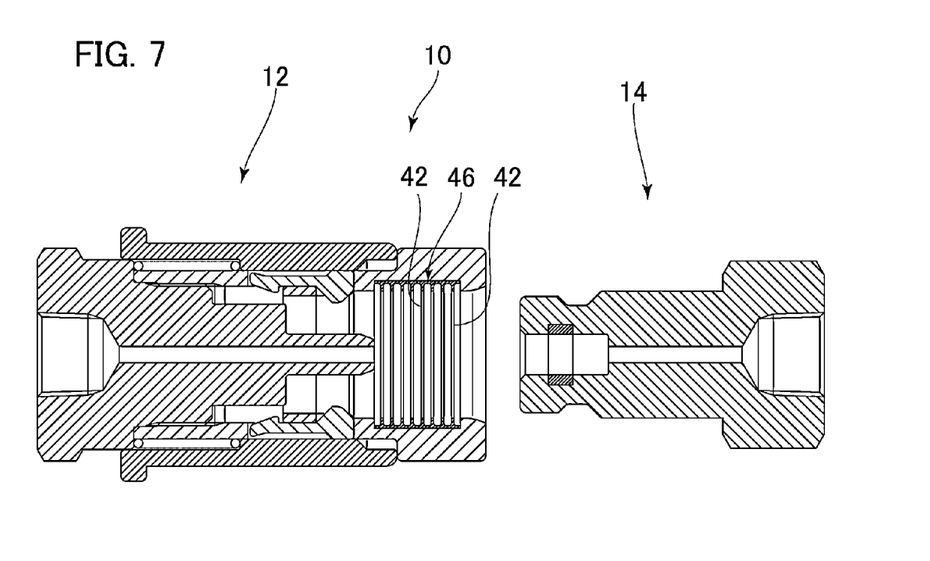
FIG. 7 is a longitudinal sectional view similar to FIG. 1, showing a pipe coupling having circumferentially extending annular pliable members.

FIG. 7 shows a modification of the embodiment shown in FIG. 1. In the modification, the pliable members 42 are annularly extending strip members, respectively.

Figure 8:
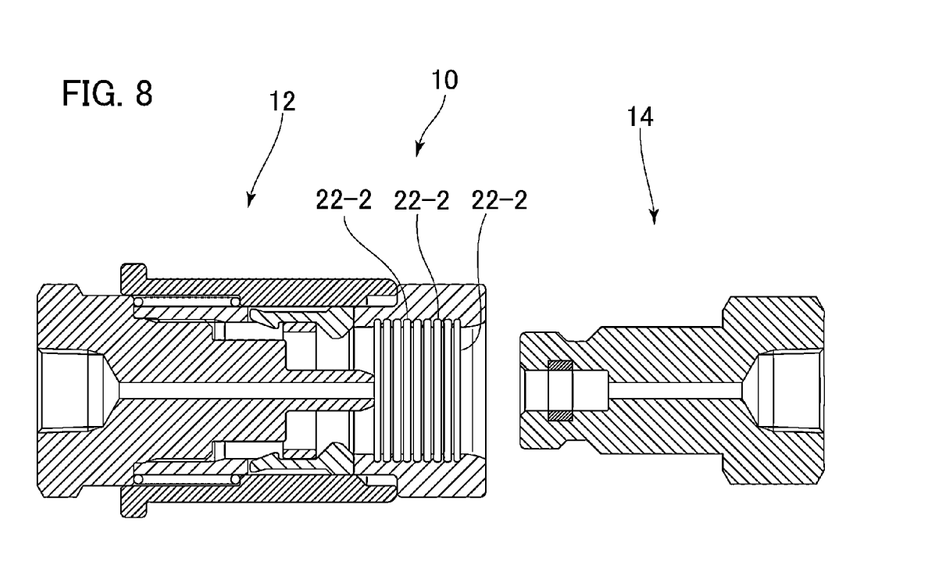
FIG. 8 is a longitudinal sectional view similar to FIG. 1, showing a pipe coupling provided with no pliable members but provided with a plurality of recesses.

FIG. 8 shows a pipe coupling 10 according to still another embodiment of the present invention. The pipe coupling 10 of this embodiment differs from the pipe coupling shown in FIG. 1 in that a plurality of axially spaced recesses 22-2 for antifreezing are provided on the inner circumferential surface 22-1 of the coupling member fitting portion 22. With the pipe coupling 10 according to this embodiment, it was confirmed possible to separate the frozen female and male coupling members 12 and 14 from each other with a reduced force similar to that in the above-described pipe coupling provided with a plurality of pliable members. The reason for this may be considered due to the fact that freezing locally occurs at scattered points as in the case of the structure having a plurality of pliable members in one recess.

Although several embodiments according to the present invention have been described above, the present invention is not limited to the described embodiments. For example, in the embodiments disclosed herein, the circumferentially extending annular recess 22 with the pliable members 42 is formed on the inner circumferential surface 22-1 of the coupling member fitting portion 22 of the female coupling member 12, it will be anticipated for those skilled in the art that such a circumferentially extending annular recess with a plurality of pliable members may be alternatively formed on the outer circumferential surface 14-3 of the fitting portion 14-1 of the male coupling member 14 for the purpose of the anti-freezing.

The invention claimed is:

1. One coupling member of a male coupling member and a female coupling member of a pipe coupling, the female coupling member including a passage extending through the female coupling member from a front end to a rear end of the female coupling member and the male coupling member including a passage extending through the male coupling member from a front end to a rear end of the male coupling member, the male coupling member being configured to be inserted into the passage of the female coupling member from the front end of the female coupling member such that the male coupling member is decouplably coupled to the female coupling member so as to form a fluid passage through the pipe coupling, and the one coupling member comprising:
 a coupling member fitting portion having a circularly extending circular surface having a width in a longitudinal axis direction of the one coupling member, the circularly extending circular surface being capable of contacting a corresponding circularly extending circular surface of a fitted portion of the other coupling member of the male coupling member and the female coupling member, the corresponding circularly extending circular surface having a width in a longitudinal axis direction of the other coupling member;
 at least one annular recess for anti-freezing formed on the circularly extending circular surface of the coupling member fitting portion, the at least one circularly extending annular recess having a width that is smaller than the width of the circularly extending circular surface of the coupling member fitting portion in the longitudinal axis direction of the one coupling member such that, the at least one annular recess has an annular opening portion opening on the circularly extending circular surface of the coupling member fitting portion and positioned axially inside front and rear edges of the circularly extending circular surface of the coupling member fitting portion in the longitudinal axis direction of the one coupling member, and a bottom portion radially corresponding to the annular opening portion; and,
 a plurality of pliable members secured to the bottom portion of the at least one annular recess and extending from the bottom portion to the annular opening portion so as to be capable of contacting the corresponding circularly extending circular surface of the other coupling member.

2. The one coupling member of claim 1, wherein the pliable members are made of a synthetic resin.

3. The one coupling member of claim 1, further comprising:
 a strip of tape having a first surface secured to the bottom portion and a second surface opposite to the first surface;
 wherein the pliable members extend from the second surface of the strip of tape.

4. The one coupling member of claim 1, wherein the one coupling member is the female coupling member and the other coupling member is the male coupling member;
 the coupling member fitting portion being a tubular member capable of receiving the male coupling member;
 the coupling member fitting portion having:
 at least one locking element displaceable between a locking position for engaging the male coupling member and an unlocking position in which the locking element is displaceable radially outward from the locking position for disengaging from the male coupling member; and
 a locking element-actuating sleeve slidably fitted over an outer circular surface of the coupling member fitting portion, the locking element-actuating sleeve being displaceable between a pressing position for pressing the locking element to the locking position from a radially outer side and a pressure canceling position for allowing the locking element to be displaced to the unlocking position; and
 the one coupling member further comprising:
 at least one annular recess for anti-freezing formed on the outer circular surface of the coupling member fitting portion, over which the locking element-actuating sleeve is configured to slide, the at least one annular recess formed on the outer circular surface of the coupling member fitting portion having an opening portion opening on the outer circular surface of the coupling member fitting portion and a bottom portion.

5. The one coupling member of claim 4, further comprising:
 a plurality of pliable members secured to the bottom portion of the at least one annular recess formed on the outer circular surface of the coupling member fitting portion and extending from the bottom portion of the at least one annular recess formed on the outer circular surface of the coupling member fitting portion to the opening portion of the at least one annular recess formed on the outer circular surface of the coupling member fitting portion so as to be capable of contacting an inner circular surface of the sleeve.

6. The one coupling member of claim 5, wherein the pliable members are made of a synthetic resin.

7. The one coupling member of claim 5, further comprising:
 a strip of tape having a first surface secured to the bottom portion of the at least one circularly extending annular recess formed on the outer circular surface of the coupling member fitting portion and a second surface opposite to the first surface;
 wherein the pliable members extend from the second surface of the strip of tape.

8. The one coupling member of claim 5 wherein the at least one locking element is one of a plurality of locking elements and the coupling member fitting portion further comprises a plurality of locking element accommodating portions each accommodating a corresponding one of the locking elements such that each locking element is movable between the locking position and the unlocking position, the locking element accommodating portions being circularly spaced from each other and provided along the at least one annular recess formed on the outer circular surface of the coupling member fitting portion so as to divide the at least one annular recess formed on the outer circular surface of the coupling member fitting portion into a plurality of circularly extending recesses.

9. A pipe coupling comprising:
 the female coupling member as defined in claim 4; and a male coupling member couplable to the female coupling member by being fitted thereto, the male coupling member having the corresponding circularly extending circular surface configured to contact the circular surface of the female coupling member in a state in which the other coupling member is fitted to the one coupling member.

10. A pipe coupling comprising:
the one coupling member of claim 1; and
another coupling member couplable to the one coupling member by being fitted thereto, the other coupling member having the corresponding circularly extending circular surface configured to contact the circular surface of the one coupling member in a state in which the other coupling member is fitted to the one coupling member.

11. The one coupling member of claim 1, wherein the one coupling member is the female coupling member.

12. A pipe coupling comprising:
the female coupling member as defined in claim 11; and
a male coupling member couplable to the female coupling member by being fitted thereto, the male coupling member having the corresponding circularly extending circular surface configured to contact the circular surface of the female coupling member in a state in which the male coupling member is fitted to the female coupling member.

13. The one coupling member of claim 1, wherein the bottom portion is planar.

\* \* \* \* \*